(No Model.) 6 Sheets—Sheet 1.

W. H. GOLDING.
PRINTING PRESS.

No. 532,548. Patented Jan. 15, 1895.

WITNESSES
H. A. Hall.
F. P. Davis.

INVENTOR:
W. H. Golding
by Wright Brown Crosley
Attys.

(No Model.) 6 Sheets—Sheet 3.

W. H. GOLDING.
PRINTING PRESS.

No. 532,548. Patented Jan. 15, 1895.

WITNESSES:
H. A. Hall.
J. P. Davis.

INVENTOR:
W. H. Golding
by Wright H Brown Moseley
Atty.

(No Model.) 6 Sheets—Sheet 4.

W. H. GOLDING.
PRINTING PRESS.

No. 532,548. Patented Jan. 15. 1895.

WITNESSES:
H. A. Hall.
J. P. Davis.

INVENTOR:
W. H. Golding
by Wright Brown Quimby
Attys (No Model.)  6 Sheets—Sheet 5.

W. H. GOLDING.
PRINTING PRESS.

No. 532,548.  Patented Jan. 15, 1895.

WITNESSES:
H. A. Hall.
J. P. Davis.

INVENTOR:
W. H. Golding
by Wright Brown Quimby
Attys.

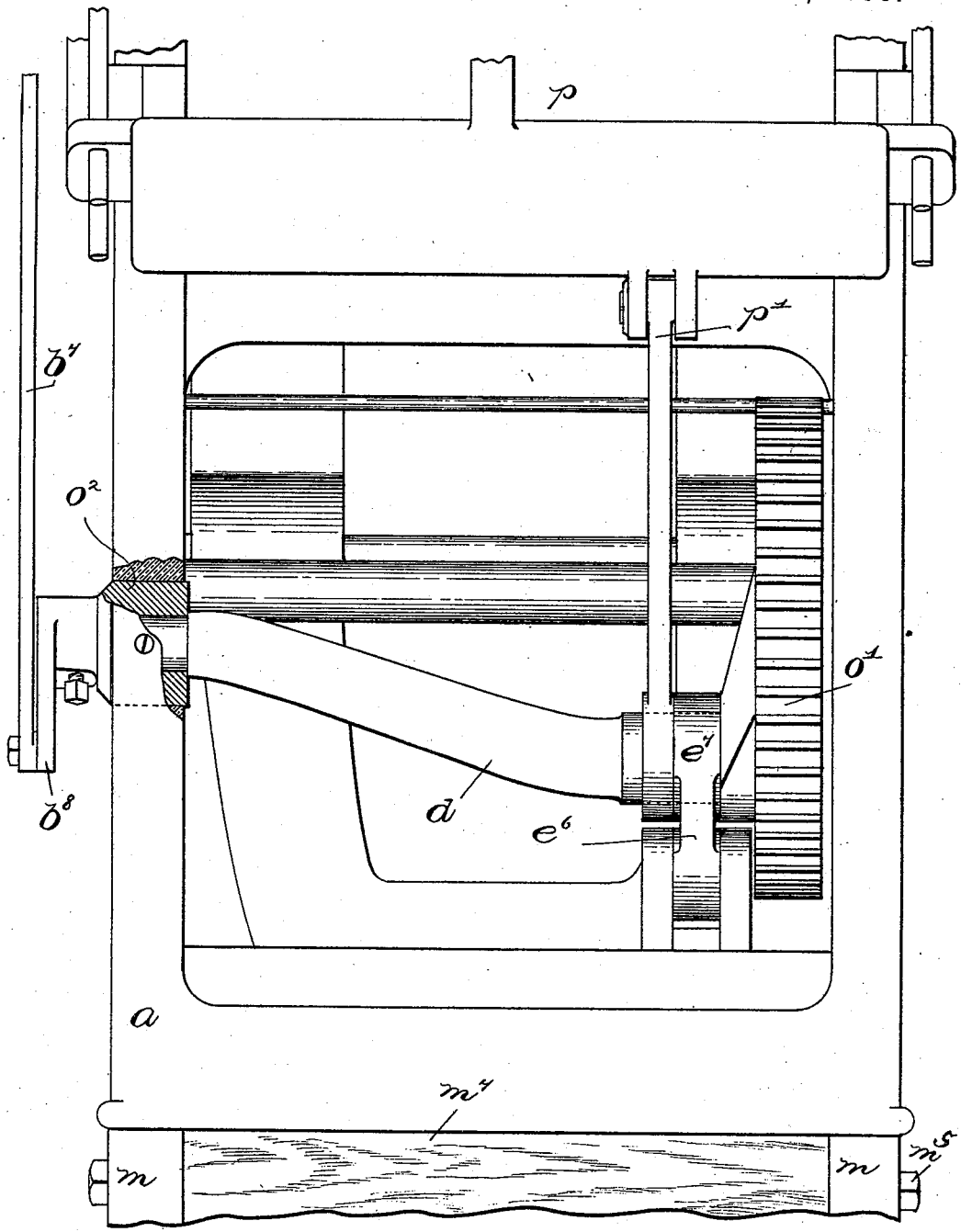

UNITED STATES PATENT OFFICE.

WILLIAM H. GOLDING, OF NEWTON, MASSACHUSETTS.

PRINTING-PRESS.

SPECIFICATION forming part of Letters Patent No. 532,548, dated January 15, 1895.

Application filed March 12, 1894. Serial No. 503,283. (No model.)

*To all whom it may concern:*

Be it known that I, WILLIAM H. GOLDING, of Newton, in the county of Middlesex and State of Massachusetts, have invented certain new and useful Improvements in Printing-Presses, of which the following is a specification.

This invention relates to that class of printing presses employing a reciprocating platen, and consists in a number of improvements calculated to increase the efficiency of the press and facilitate its manipulation, all of which are fully described hereinafter and pointed out in the claims appended.

Reference is to be had to the annexed drawings and to the letters marked thereon, forming a part of this specification, the same letters designating the same parts or features, as the case may be, wherever they occur.

Figure 1:
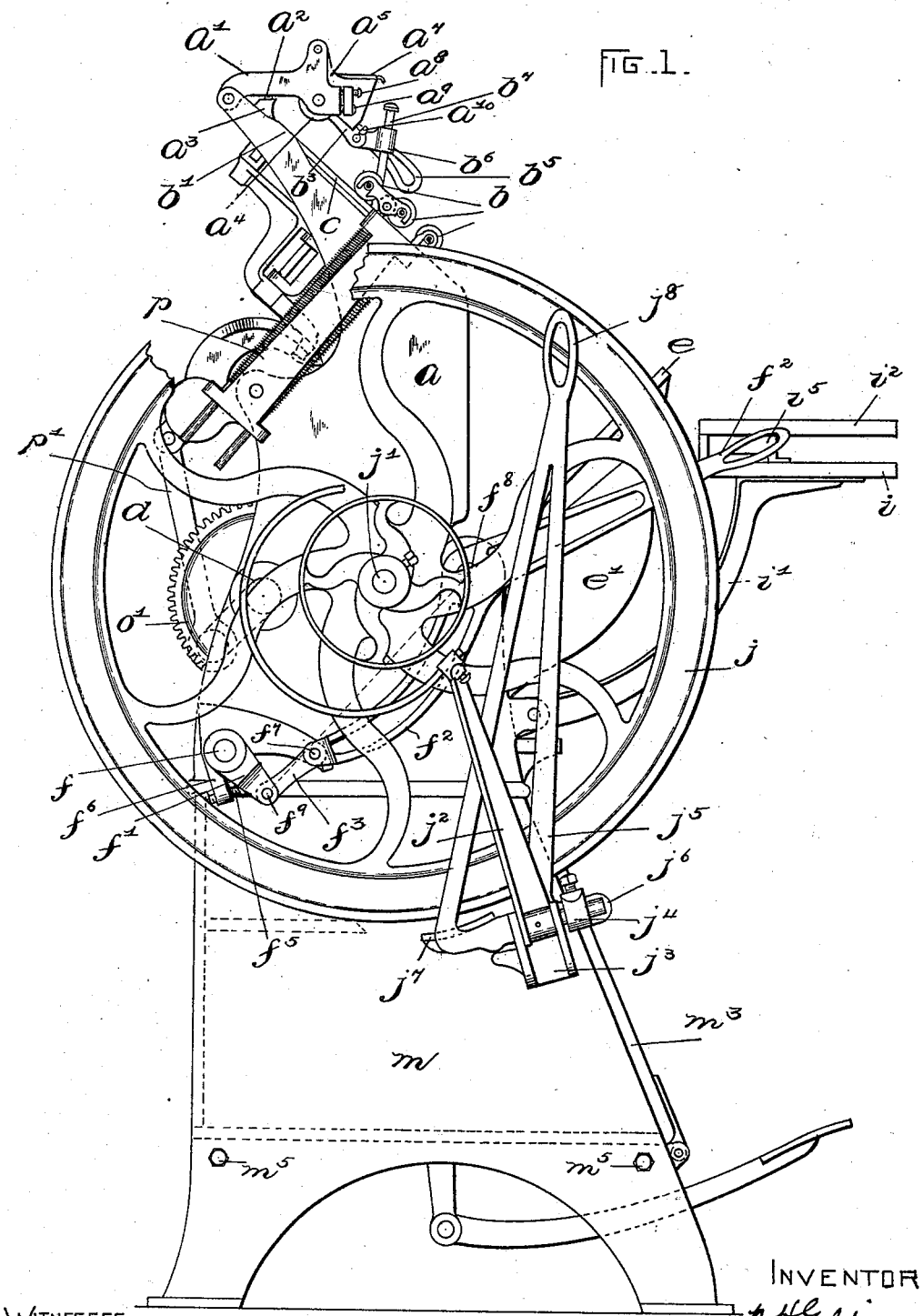
Figure 2:
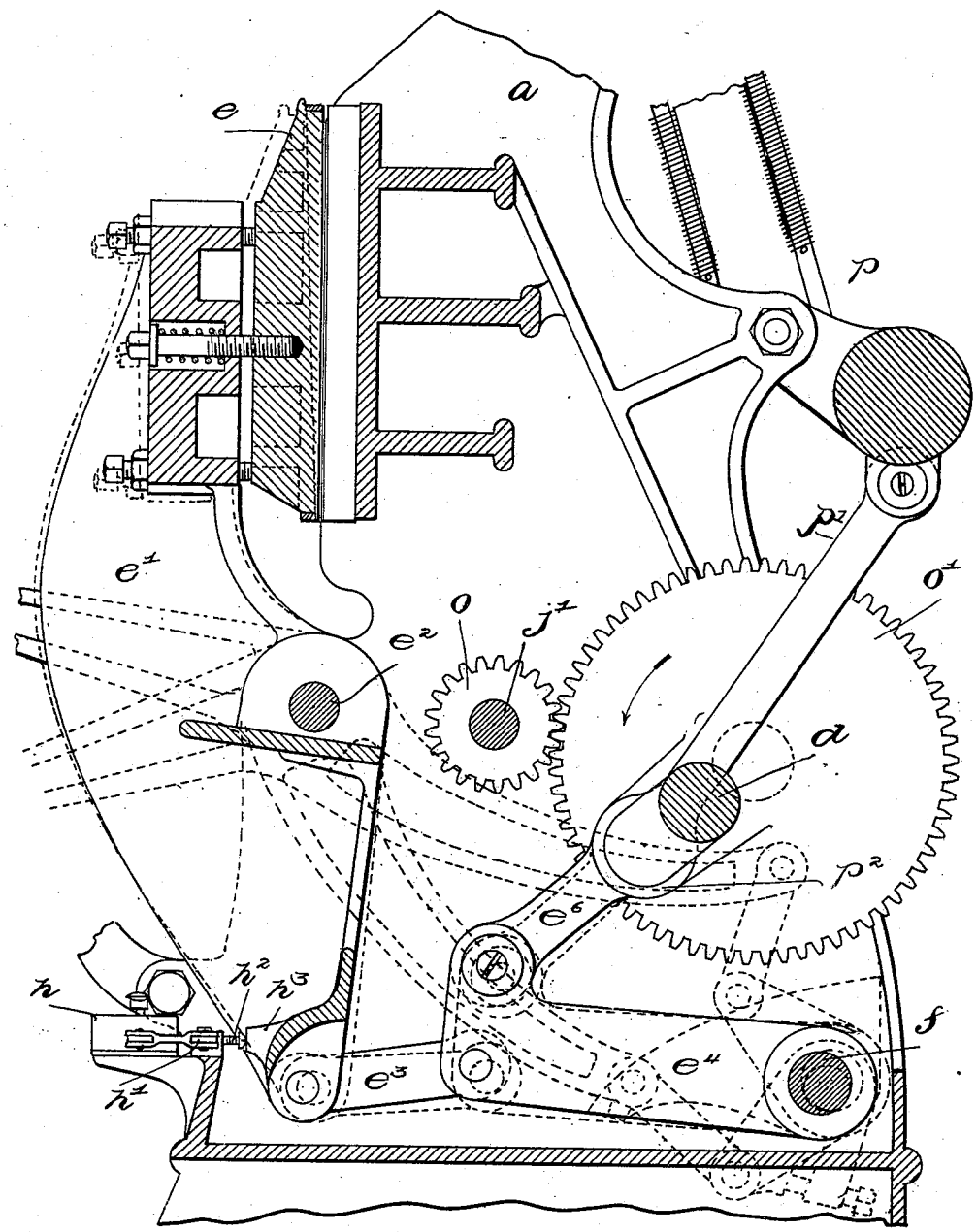
Figure 4:
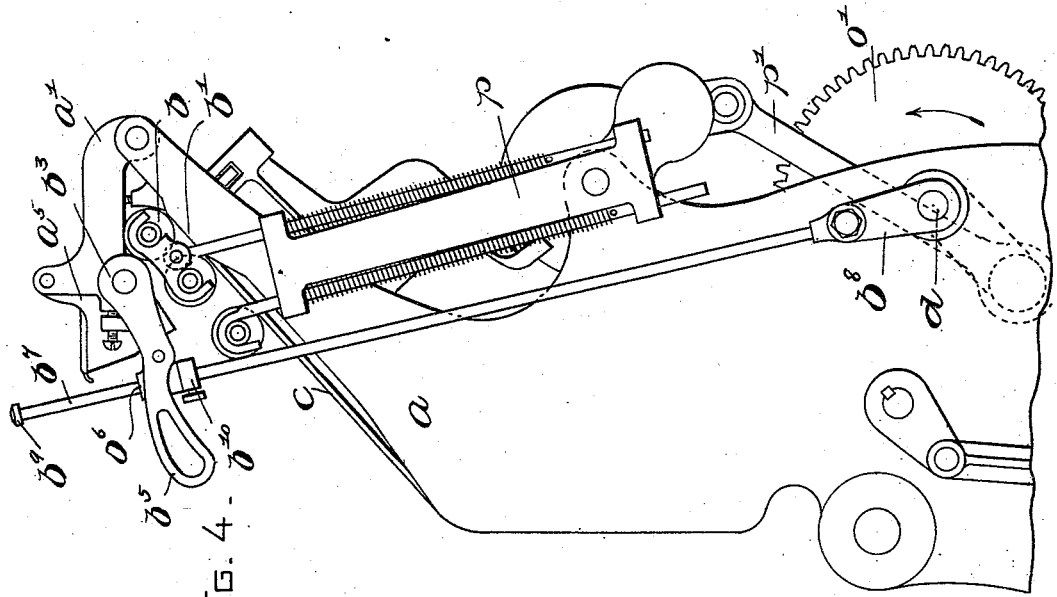
Figure 3:
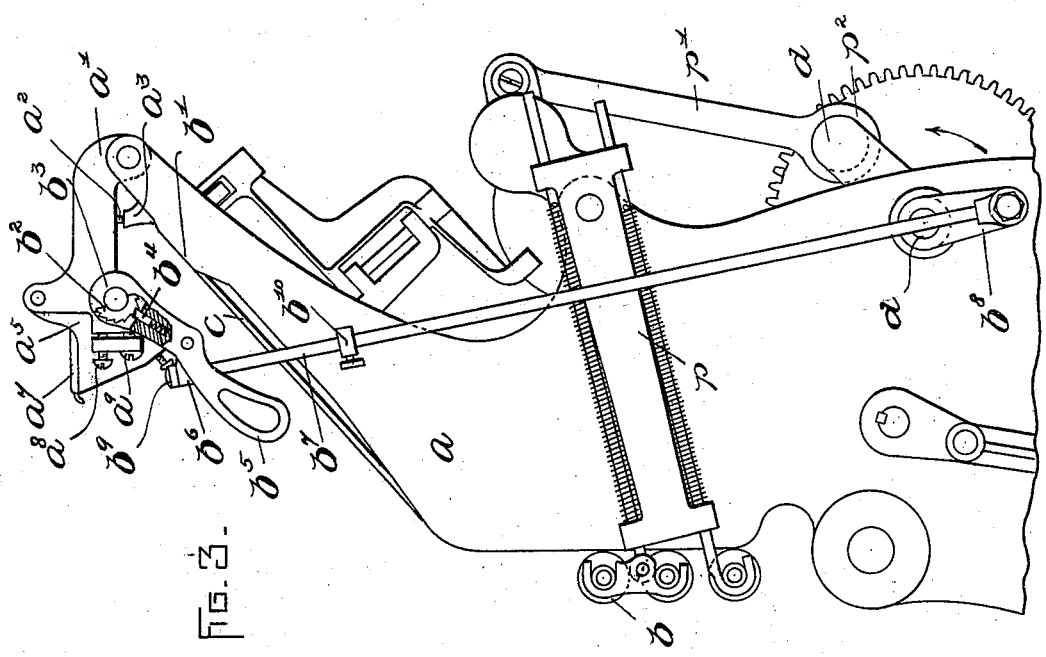
Figure 5:
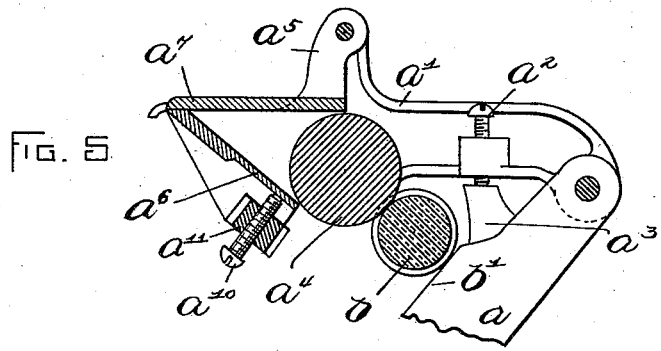
Figure 6:
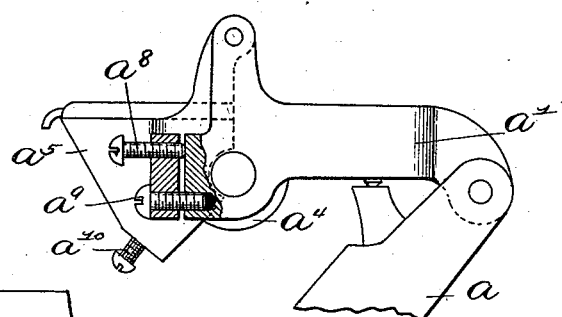
Figure 7:
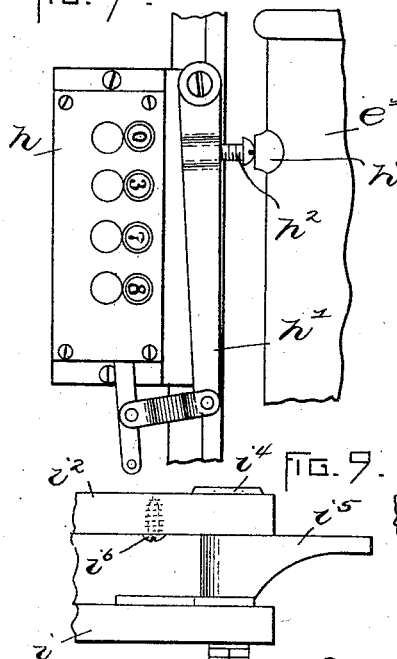
Figure 8:
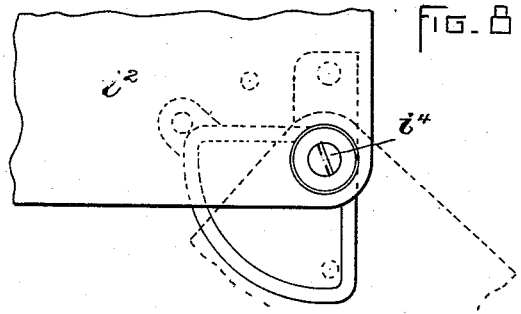
Figure 9:
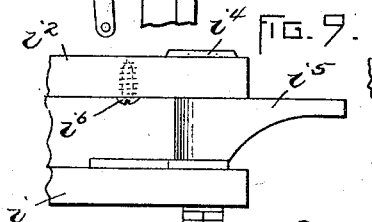
Figure 10:
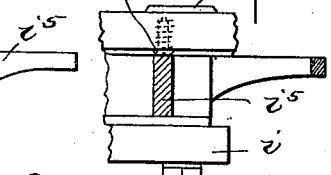
Figure 11:
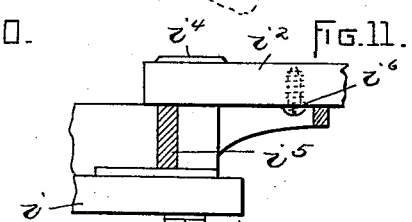
Figure 12:
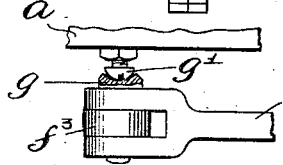
Figure 13:
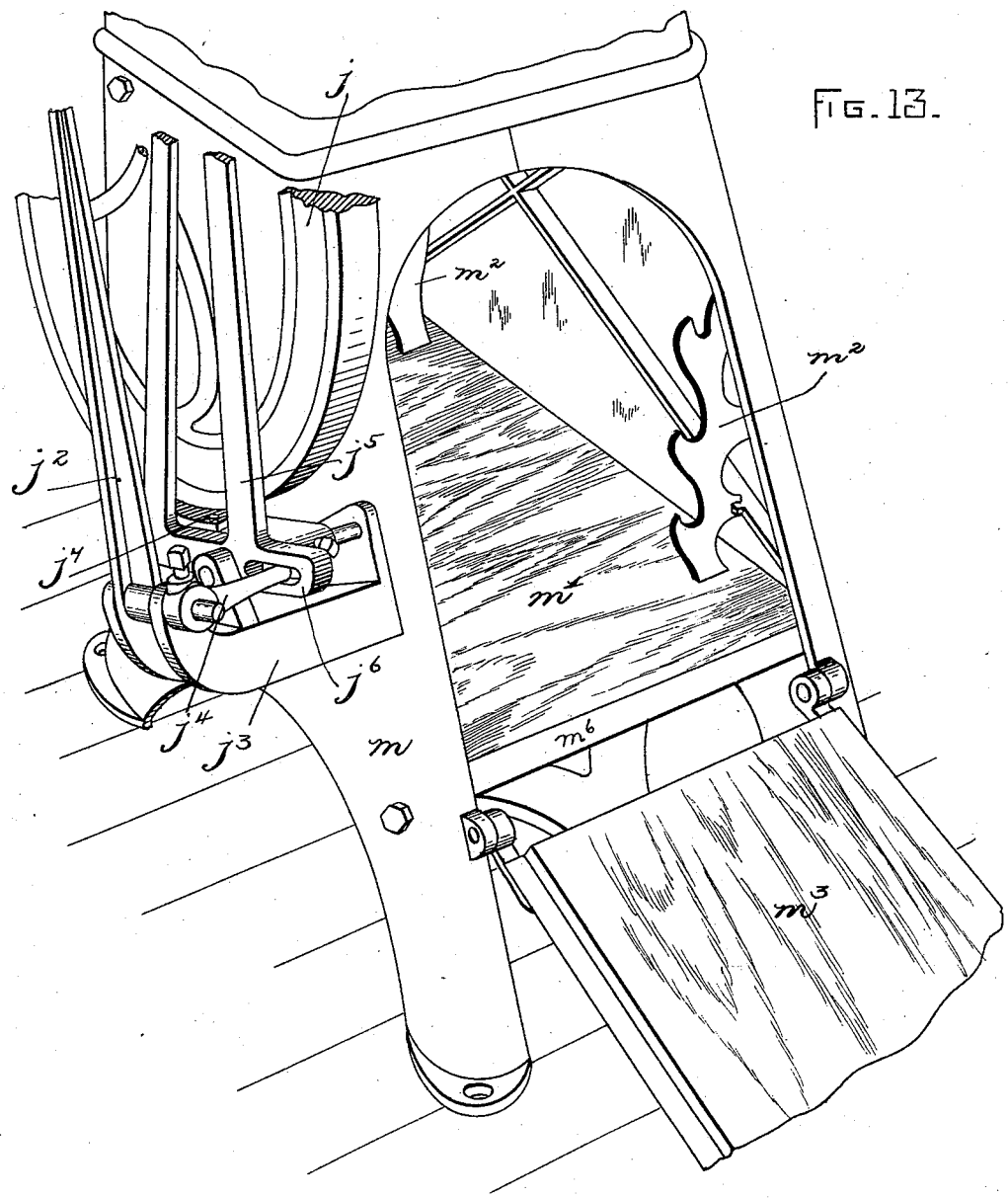

Figure 1 shows a side elevation of the press. Fig. 2 shows a sectional view on an enlarged scale of the platen-operating means. Figs. 3 and 4 show the upper portion of the press in side elevation on an enlarged scale as viewed from the opposite side to that seen in Fig. 1. Fig. 5 shows a cross-section of an ink-receptacle and rollers. Fig. 6 shows the same parts in side elevation partially broken away. Fig. 7 shows a detail of registering or counting means. Fig. 8 shows a detail of part of a work-table and appurtenances. Figs. 9, 10 and 11 show sectional views illustrative of means for holding a swiveled leaf of said table in different positions. Fig. 12 shows a detail of means for holding the throw-off mechanism in one adjustment. Fig. 13 shows a perspective of the supporting base of the machine, and a belt-shifting and brake-applying mechanism. Fig. 14 shows a rear elevation of the press represented as broken out at one part.

The upright sides, $a$, of the machine have pivotally connected with their upper ends arms, $a'$, which are provided with set-screws, $a^2$, to bear on lugs, $a^3$, on said upright sides and support the arms. An ink-transferring roller, $a^4$, is supported by said arms as is also an ink-receptacle, $a^5$, which is pivotally connected with the arms and provided with an inclined bottom, $a^6$, whose edge extends along the roller, $a^4$, and a hinged lid, $a^7$. The amount of space allowed for exit of ink between the edge of said inclined bottom and the surface of the roller is regulated by means of screws $a^8$ and $a^9$ entered through an ear on the ink-receptacle, and one bearing against the arm $a'$, while the other enters a threaded hole therein. A set screw, $a^{10}$, entered through a cross-bar, $a^{11}$, extending between depending portions of the sides of the receptacle, and bearing against the under side of the inclined bottom, $a^6$, provides means for truing said bottom with respect to the roller, i. e., making its edge parallel with the roller so there will be a uniform distribution of ink thereon. There may be more than one of these screws $a^{10}$.

The usual yieldingly supported distributing rollers, $b$, are arranged to travel over the intermittently moving disk, $c$, and in the construction here shown the sides, $a$, are formed with raised edges, $b'$, near the upper end, and the upper roller, $b$, is designed to run up on these edges, $b'$, and be raised thereby out of contact with the disk, $c$, and into contact with the roller, $a^4$, so as to receive ink therefrom. The roller, $a^4$, is partially rotated while the roller, $b$, is in contact with it, through connections with the crank-shaft, $d$, as follows: The said roller, $a^4$, carries affixed to it a ratchet-wheel, $b^2$, and an arm, $b^3$, mounted loosely on the journal of said roller carries a spring-pressed pawl, $b^4$, engaging said ratchet. A handle, $b^5$, is formed on said arm and a boss, $b^6$, is pivoted on one side of the arm. A rod, $b^7$, extends loosely through the said boss, and is connected at its lower end with a crank, $b^8$, on the shaft $d$. Said rod has a head, $b^9$, at the upper end to abut the upper side of the boss, $b^6$, and an adjustable collar, $b^{10}$, to abut the under side of said boss. The downward throw of the crank, $b^8$, moves the arm, $b^3$, down by reason of the engagement of the head, $b^9$, with the boss, $b^6$, and thereby the roller, $a^4$, is turned; and the upward throw of the said crank moves the said arm upward by reason of the engagement of the collar, $b^{10}$, with the boss, $b^6$, and thereby the pawl recovers for a new stroke. By adjusting the collar, $b^{10}$, the extent of movement of the roller is determined. The roller can be turned by hand when desired by moving the handle, $b^5$, up and down, the boss, $b^6$, then sliding on the rod, $b^7$. The amount of pressure between rollers, $a^4$, and $b$, may be regulated by means of the screws, $a^2$.

The platen, $e$, is mounted on a vibratory support, $e'$, pivoted at $e^2$, and is oscillated by means of a toggle-lever composed of members, $e^3$, and $e^4$, the latter being connected by a link, $e^6$, with the crank $d$. The pressure is thrown on and off, i.e., the adjustment of the platen to operative or inoperative adjustment with relation to the bed, is obtained through the following means: The member, $e^4$, of the toggle-lever is mounted on an eccentric, $f$, to one of whose journals is affixed an arm, $f'$. A lever, $f^2$, pivoted centrally to a fixed support, has its lower end connected with the arm, $f'$, by a link, $f^3$, and its outer or upper end projects at the front of the machine in easy reach of the operator. It will be seen that by turning the eccentric $f$, the adjustment of the platen will be changed, and when the larger side of the eccentric is forward the platen is adjusted to operate against the bed or in other words, the pressure is on, whereas when the large side of the eccentric is rearward the pressure is off. This is clearly illustrated in Fig. 2 where the full lines show one adjustment and the broken lines the other. These two adjustments are effected by operating the lever, $f^2$. When the latter is in its upward position the arm $f'$, is turned down against a set-screw, $f^5$, entered through a stationary lug, $f^6$, and the large side of the eccentric is thrown forward. It is to be noted that under this adjustment the point of connection between the lever and the link at $f^7$ is below a line drawn between the pivot of said lever at $f^8$ and the point of connection between the link $f^3$ and the arm $f'$ at $f^9$. (See Fig. 1.) The stop-screw, $f^5$, is adjusted to resist the movement of the connection, $f^7$, across this line, and the parts have to be sprung somewhat to carry the connection over. Hence, the parts will be locked in this position and cannot be displaced except by a downward pressure on the handle of the lever. By such downward pressure the adjustment is broken and the eccentric moved to the other adjustment and the pressure is thrown off. The parts are locked in the latter adjustment by means of a socketed projection, $g$, on the lever (see Fig. 12) which engages with the round head of a screw, $g'$, fastened in the side of the machine frame, the lever having sufficient resiliency to bring about engagement of these parts.

A registering or counting mechanism, $h$, is fastened on a horizontal bracket at the lower front part of the machine, and a lever, $h'$, operatively connected with the mechanism carries a set-screw, $h^2$, adapted to be acted on by a projection, $h^3$, on the vibrating platen-support, $e'$, when the latter is adjusted to maintain the platen operative. When the pressure is thrown off the lower end of the support, $e'$, having said projection, $h^3$, is moved back, and does not advance far enough to operate the counting mechanism. Thus the counting mechanism is only actuated when the pressure is on and the printing in progress.

A horizontal table, $i$, is supported on brackets, $i'$, at the front of the machine and designed to hold the printed matter. A leaf, $i^2$, is swiveled to the said table at one corner thereof by a bolt, $i^4$, and may be locked in closed and open adjustment by means of a triangular frame, $i^5$, fastened to the table, and a screw, $i^6$, fastened in the leaf, the round head of said screw adapted to be sprung over the sides of said frame, as shown in Fig. 10. This leaf is to hold the matter to be printed.

Fast and loose pulleys and a fly-wheel, $j$, are mounted on the driving shaft, $j'$, of the machine, and a belt-shipper, $j^2$, is pivoted to a bracket, $j^3$, on the machine frame and has an arm, $j^4$, affixed to its journal. A lever, $j^5$, is pivoted to ears on the bracket, $j^3$, and has a slotted arm, $j^6$, engaging the arm $j^4$. A brake-shoe, $j^7$, is affixed to the lever's pivot and arranged to bear against the periphery of the fly-wheel. The lever has a handle, $j^8$, in easy reach of the attendant, who by operating said lever can shift the belt and apply the brake-shoe at the same time, thus instantly stopping the machine.

The supporting base, $m$, of the machine is a hollow two-part casting connected by bolts, $m^5$, and it is utilized as a store-room for the rollers. The floor, $m^6$, of this room is a wooden board, $m'$, whose grain runs transversely of the room so as to obviate warping, and the back, $m^7$, is a similarly disposed board.

Racks, $m^2$, are arranged within the room to hold the rollers, and the room is closed by a hinged door, $m^3$.

The driving-shaft, $j'$, is connected with the crank shaft, $d$, by gears, $o$, and $o'$, and it is to be noted that the crank is cast in one piece with the gear $o'$. The outer end of the crank journals in a bushing, $o^2$, fastened in a hole in the frame-casting, said hole being made large enough to permit the insertion of the crank allowing for its bend.

The oscillatory frame, $p$, which carries the ink-distributing rollers, $b$, is connected by a link, $p'$, with the crank, $d$.

It is to be observed that the collars, $p^2$ and $e^7$, which embrace the crank, $d$, are formed integral with the links, $p'$ and $e^6$, respectively, and that the arm of the crank is reduced so as to permit of said collars being slipped over the same on to the wrist of the crank.

Having thus explained the nature of the invention and described a way of constructing and using the same, though without attempting to set forth all of the forms in which it may be made or all of the modes of its use, it is declared that what is claimed is—

1. A printing press comprising in its construction an inking roller, an ink receptacle pivotally suspended from a suitable support and having an inclined bottom whose edge extends along the said roller, and a set-screw and a draft-screw at each end of the receptacle to regulate the width of opening between said edge and the roller.

2. A printing press comprising in its construction an inking roller, an ink receptacle pivotally suspended from a suitable support and having an inclined bottom whose edge extends along said roller, a set screw entered through portions of the receptacle at each end of the latter and bearing against the support, a set screw bearing directly against said inclined bottom and a draft screw at each end fastened in the support and extending through portions of the receptacle, substantially as specified.

3. A printing press comprising in its construction an inking roller, an ink receptacle having an integral inclined bottom and whose edge extends along the said roller and an integral beam extending from side to side of said receptacle below the inclined bottom, both formed in one casting, and a set screw entered through said beam and bearing against said inclined bottom so as to hold the edge of the latter parallel with the roller, substantially as specified.

4. In a printing press the combination of an ink-holder, a roll for transferring ink therefrom, a ratchet on said roll, an arm loosely mounted on the journal of said roll and carrying a pawl in engagement with the ratchet, a boss pivotally mounted on said arm between its ends an arm on the driving-crank, and a rod connected with said arm and having a sliding engagement with the pivoted boss on the first-named arm, and abutments to coact with the same.

5. In a printing press, the combination with a vibratory support for the platen, and a toggle-lever for operating the same and connected with the crank-shaft, of an eccentric supporting one end of the toggle, an arm affixed to the eccentric, an operating lever, a link connecting the same with the arm, and a stop against which the said arm abuts to resist movement of the connection between the lever and link across a line drawn between the pivot of the lever and the point of connection between the link and arm, for the purpose described.

6. In a printing press, the combination with a vibratory support for the platen, and a toggle-lever for operating the same and connected with the crank-shaft, of an eccentric supporting one end of the toggle, an arm affixed to the eccentric, an operating lever connected with said arm and having a projection on one side with a concavity in its end, and a fixed stud to engage said concavity, in the manner and for the purpose described.

7. In a printing press, the combination of a supporting base having a bracket at the lower front portion, a vibratory platen-support whose lower end is behind said bracket, means for throwing the platen into or out of operative adjustment by movement of its support, and a register supported on the bracket of the base and having a member projecting in the path of the vibratory platen-support and adapted to co-act therewith only when it is adjusted to maintain the platen in operative position, substantially as specified.

8. In a printing press, a stationary work-supporting table, a frame fastened thereto, and a leaf swiveled to the table and having an adjustable rounded projection adapted to engage the sides of the said frame and to be sprung over the same, substantially as and for the purpose described.

9. A printing press comprising in its construction a vibrating platen, a toggle for operating the same, an eccentric on which one member of said toggle is mounted a vibrating frame carrying the distributing rollers, a driving crank, a link connecting the wrist of said crank with the toggle, and a link connecting said wrist with the roller carrying frame, substantially as specified.

10. A printing press comprising in its construction a vibrating platen, a toggle for operating the same, an eccentric on which one member of said toggle is mounted a vibrating frame carrying the distributing rollers, a driving-crank, and links connecting the latter with the toggle and frame respectively, said links being formed with integral collars to embrace the wrist of the crank, the end of said crank being reduced to permit of said collars being slid thereover, substantially as described.

In testimony whereof I have signed my name to this specification, in the presence of two subscribing witnesses, this 1st day of March, A. D. 1894.

WILLIAM H. GOLDING.

Witnesses:
C. F. BROWN,
A. D. HARRISON.